United States Patent [19]

Scheyer

[11] Patent Number: 5,412,876
[45] Date of Patent: May 9, 1995

[54] PROTECTIVE CAP FOR THE END OF A LEVEL HAVING AN I-SHAPED CROSS-SECTION

[76] Inventor: Dietmar Scheyer, Konstanzer Strasse 34, A-6840 Götzis, Austria

[21] Appl. No.: 228,214

[22] Filed: Apr. 15, 1994

[30] Foreign Application Priority Data

May 19, 1993 [AT] Austria ................................. 983/93

[51] Int. Cl.[6] .................................................. G01C 9/24
[52] U.S. Cl. .......................................... 33/379; 33/350
[58] Field of Search ............................ 33/350, 379–382

[56] References Cited

U.S. PATENT DOCUMENTS

| | | | |
|---|---|---|---|
| 4,463,501 | 8/1984 | Wright et al. | 33/379 X |
| 4,979,310 | 12/1990 | Wright | 33/379 |
| 4,991,303 | 2/1991 | Marth et al. | 33/379 |

*Primary Examiner*—Alvin Wirthlin
*Attorney, Agent, or Firm*—Friedrich Kueffner

[57] ABSTRACT

A spirit level includes a spirit level body having an I-shaped cross section, end caps arranged at the end faces of the spirit level body and at least one spirit level vial mounted in the spirit level body. Each end cap has a plate-like base member which is rectangular in the elevational view thereof and whose height and width corresponds to the height and width of the I-shaped cross section of the spirit level body. The base member has on one side thereof two wing lugs which define a gap therebetween. The width of the gap between the wing lugs corresponds to the wall thickness of the web of the spirit level body which is I-shaped in cross section. At least one recess is provided in the end face of the web of the spirit level body. The at least one recess has at least one toothed side. At least one projecting lug is provided within the gap between the wing lugs of the base member. The projecting lug is received in a positively engaging manner by the recess and serves to fasten the base member to the spirit level body. The height of the wing lugs measured at a right angle to the plane of the base member is at least as large as the depth of the recess in the end face of the web measured in the direction of the longitudinal axis of the spirit level body.

11 Claims, 2 Drawing Sheets

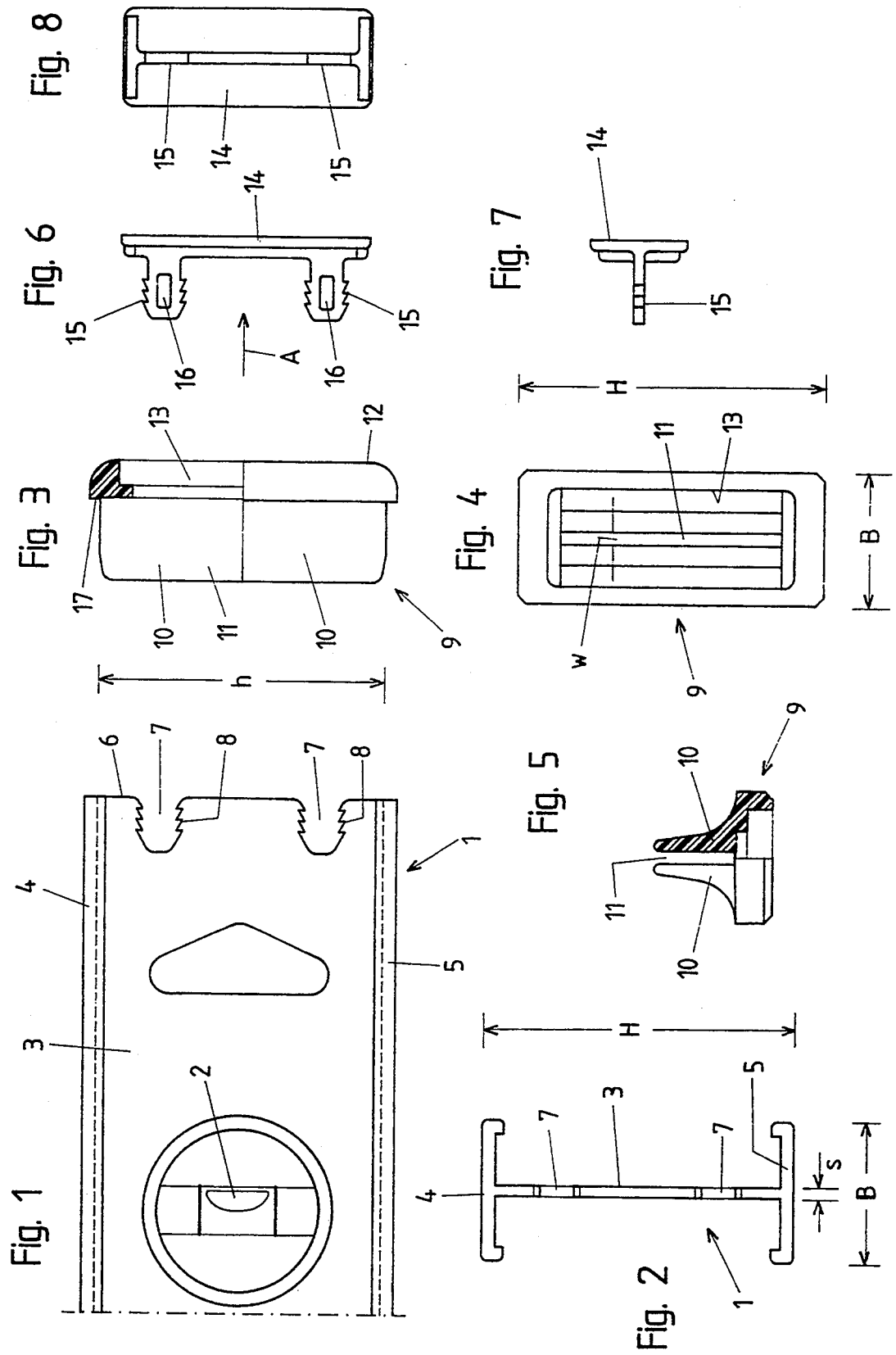

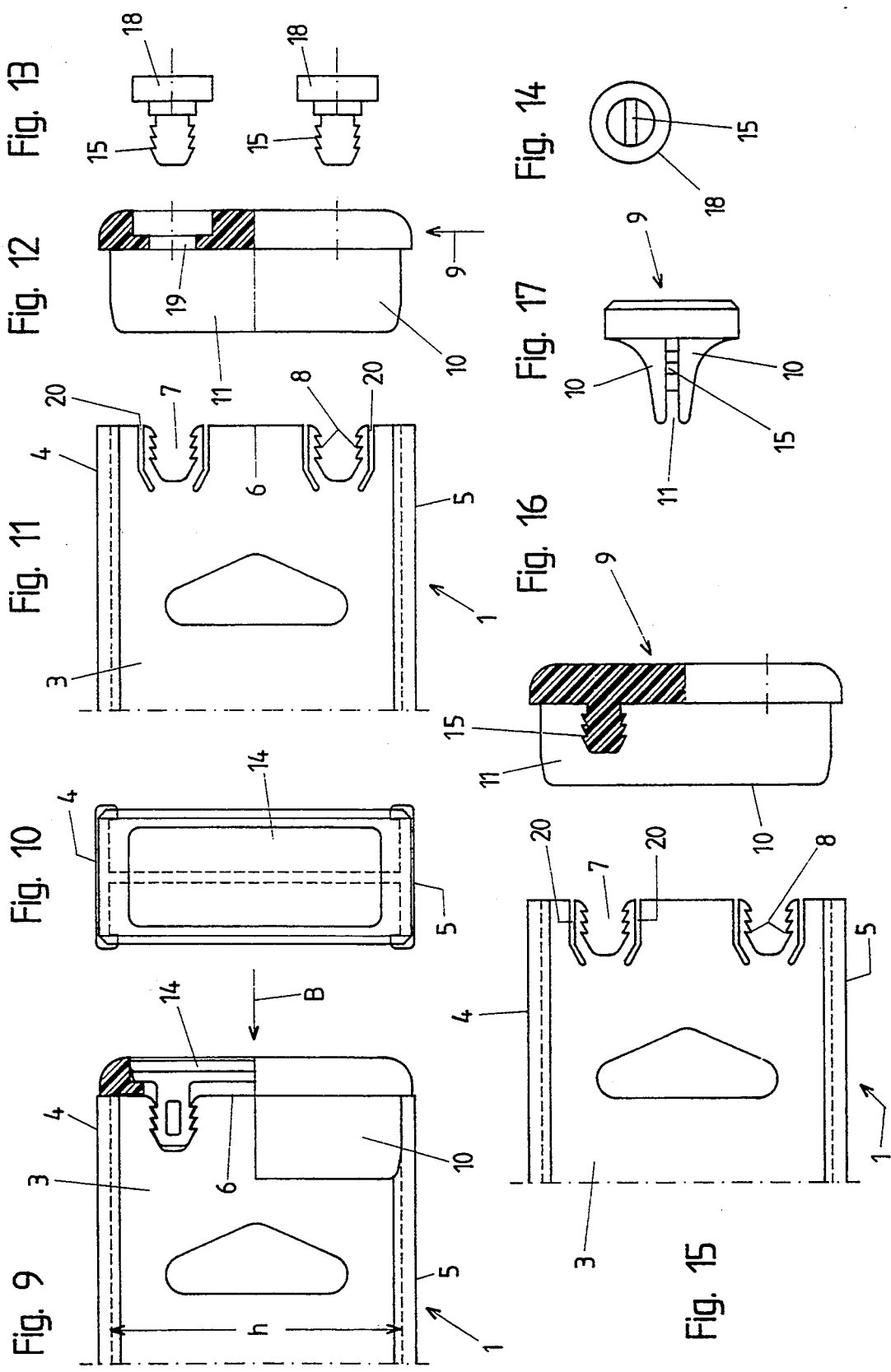

PROTECTIVE CAP FOR THE END OF A LEVEL HAVING AN I-SHAPED CROSS-SECTION

BACKGROUND OF THE INVENTION

1. Field of the Invention

The present invention relates to a spirit level with a spirit level body having an I-shaped cross section, end caps arranged at the end faces of the spirit level body and at least one spirit level vial mounted in the spirit level body. Each end cap has a plate-like base member which is rectangular in the elevational view thereof and whose height and width corresponds to the height and width of the I-shaped cross section of the spirit level body. The base member has on one side thereof two wing lugs which define a gap therebetween. The width of the gap between the wing lugs corresponds to the wall thickness of the web of the spirit level body which is I-shaped in cross section.

2. Description of the Related Art

Spirit level bodies having the above-described cross section are usually constructed as aluminum sections. The individual spirit level bodies intended for a spirit level are cut in the desired length from sectional members. As a result, the end faces of the spirit level bodies frequently have sharp edges and can cause injury to the user of the spirit level. For this reason, end caps are provided at the end faces, wherein the end caps not only have the purpose of eliminating the danger of injury, but also serve to protect the end of the section, which is necessary because experience has shown that spirit levels are usually not treated in the manner which would be appropriate for a measuring device, particularly on construction sites. Rather, spirit levels are subjected to extremely rough operating conditions on construction sites.

A spirit level with an end cap of the type described above is illustrated and described in U.S. Pat. No. 4,991,303. The end cap is of a resistant plastics material and has at a base member two spaced-apart wing lugs which receive therebetween the web of the spirit level body extending between the two flanges of the I-shaped spirit level body. The end cap is fastened in some manner, for example, by gluing, by means of fasteners or similar measures.

SUMMARY OF THE INVENTION

It is the primary object of the present invention, starting from the spirit levels known in the art, to provide a spirit level with an end cap which can be undetachably fastened simply and quickly and without the use of additional materials and special tools.

In accordance with the present invention, at least one recess is provided in the end face of the web of the spirit level body. The at least one recess has at least one toothed side. At least one projecting lug is provided within the gap between the wing lugs of the base member. The projecting lug has a circumferential contour which corresponds essentially to that of the recess provided in the end face of the web. The projecting lug is received in a positively engaging manner by the recess and serves to fasten the base member to the spirit level body. The height of the wing lugs measured at a right angle to the plane of the base member is at least as large as, preferably greater than, the depth of the recess in the end face of the web measured in the direction of the longitudinal axis of the spirit level body.

In accordance with a special feature of the present invention, the gap between the wing lugs extends at least partially through the base member. The projecting lug whose circumferential contour corresponds essentially to the recess provided in the end face of the web is inserted from the outer side of the base member. The projecting lug is received in a positively engaging manner by the recess and the outer end of the projecting lug rests against the base member. In this case, the lugs are individual and separately manufactured components which can be inserted in the manner of snap fasteners, wherein the insertion requires the application of a relatively small force.

In order to utilize the surface areas available for supporting the projecting lugs, a useful feature provides that the width of the projecting lugs corresponds to the thickness of the web of the spirit level body.

In accordance with another feature, the end of the projecting lug resting against the outside of the base member is constructed in the shape of a plate. This makes it possible to guide the separately manufactured individual lugs in the correct position, if necessary on automatic assembly machines, without requiring complicated structural means. The plate-like ends can then serve as stands or support surfaces for receiving the lugs in feeding rails of such automatic assembly machines, so that the lugs can be positioned with respect to one dimension.

The plate-like end of the lug may be constructed as a rectangular plate. This increases the degree of positioning, i.e., the lugs can be positioned at least with respect to two directions in the feeding rails of automatic assembly machines.

In accordance with another feature of the present invention, a rectangular indentation is provided at the outer side of the base member. The circumferential contour of the indentation and the depth of the indentation correspond to the circumferential contour and the thickness of the rectangular plate which supports the projecting lug. The rectangular plate is received preferably flush within the indentation of the plate. As a result, the assembled lug and, thus, the end cap, can no longer be removed without destruction because the flush mounting in the base member has the result that practically no points of attack are available for a tool.

In order to make the connection between spirit level body and end cap as stable as possible, at least two projecting lugs are integrally connected to the rectangular plate and the two projecting lugs are located in one plane, so that two points of fastening are provided over the height of the web of the spirit level body.

To make it possible that the components could also be mounted manually if necessary without the application of great force and without the use of special tools, the lugs and/or the sides of the recesses receiving the lugs at the end face of the web are elastically deformable.

When the gap between the wing lugs extends entirely through the base member, the injection molding tool required for manufacturing the base member can be of simple construction. If relatively hard and resistant materials are used for manufacturing the connecting components, it is useful if the projecting lugs have longitudinal slots and/or if slots are provided parallel to and near the sides of the recesses provided in the end face of the web, so that the deformability required for the assembly is achieved.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a partial side view showing the end of a spirit level body having an I-shaped cross section;

FIG. 2 is a front view of the spirit level body of FIG. 1;

FIG. 3 is a side view, partially in section, of the base member of an end cap for the spirit level body;

FIG. 4 is a front view of the base member of FIG. 3;

FIG. 5 is a top view of the base member of FIG. 3;

FIG. 6 is a side view showing the projecting lugs mounted on a plate;

FIG. 7 is a top view of the projecting lugs and plate of FIG. 6;

FIG. 8 is a front view of the projecting lugs and disk of FIG. 6;

FIG. 9 is a partial side view of the end of the assembled spirit level;

FIG. 10 is a front view of the assembled spirit level of FIG. 9;

FIGS. 11, 12 and 13 show the components of a second embodiment of the present invention corresponding to the views of FIGS. 1, 3 and 6, respectively;

FIG. 14 is a front view of a projecting lug;

FIGS. 15, 16 and 17 are views showing a third embodiment of the present invention corresponding to the views of FIGS. 1, 3 and 5, respectively.

DESCRIPTION OF THE PREFERRED EMBODIMENTS

As shown in FIG. 1 of the drawing, the spirit level body 1 of the spirit level according to the present invention is composed of an aluminum section which is I-shaped in cross section and has a vertical web 3 and upper and lower horizontal flanges 4 and 5. One or more spirit level vials 2 are mounted in the spirit level body 1 in the known manner.

In the illustrated embodiment, two recesses 7 with toothed sides 8 are provided in the end face 6 of the web 3. The recesses 7 extend essentially parallel to the longitudinal direction or longitudinal axis of the aluminum section.

The end cap for the spirit level body 3 shown in FIGS. 3, 4 and 5 is of plastics material and includes a base member 9. The base member 9 has a rectangular shape. The height H and the width B of the base member 9 are the same as the corresponding dimensions of the I-shaped cross section of the spirit level body 1, as can be seen by comparing FIGS. 2 and 4. Two wing lugs 10 are integrally formed on one side of the base member 9. The two wing lugs 10 define a gap 11 whose width W corresponds to the thickness S of the web 3.

The height h of the wing lugs 10 measured parallel to the plane of the base member 9 corresponds to the inner height of the I-shaped cross section of the spirit level body 1. The surfaces of the wing lugs 10 which face each other and define the gap 11 are essentially plane. The outer surfaces of the wing lugs 10 are curved outwardly toward the outer edges of the base member 9, as illustrated in FIG. 5. As can be seen in FIGS. 3 and 4, the gap 11 extends along the base member 9 over the inner height thereof. A rectangular indentation 13 is provided on the outer side 12 of the base member 9. The circumferential contour and the depth of the indentation correspond essentially to the circumferential contour and the thickness of the rectangular plate 14 to which two projecting lugs 15 located one above the other are integrally connected. The projecting lugs 15 serve as locking elements and the shape of the projecting lugs 15 corresponds to the contours of the recess 7. The projecting lugs 15 are provided with a longitudinal slot 16 which provides the lugs with a certain resiliency in a plane which extends at a right angle to the plate 14 and includes the two lugs 15.

The components described above and shown in the drawing are connected in the manner shown in FIG. 9. Initially, the base member 9 is placed on the end face of the I-shaped section in such a way that the two wing lugs 10 receive the web 3 therebetween and the base member 9 rests with a stop side 17 against the flanges 4 and 5 of the I-shaped section. The projecting lugs 15 are now inserted from the outside into the gap 11 and are pressed in until the disk 14 supporting the lugs 15 is placed in the indentation 13 of the base member 9 and the projecting lugs 15 are received with their toothed edges by the recesses 7 and are held by the recesses 7 in a positively engaging manner. The lugs 15 serve as locking elements for securing the base member 9 to the spirit level body 1. This connection is secure and permanent and can be achieved without special tools. The connection can no longer be disconnected without destroying the lugs 15 serving as locking elements.

In the embodiment described above and illustrated in FIGS. 1-10, two lugs 15 serving as locking elements are provided at each end face of the spirit level body 1. Basically, it is also possible to provide only a single lug 15. In addition, in this embodiment, the two lugs 15 are integrally connected to a disk 14 as a common support member.

In the embodiment of FIGS. 11-14, the lugs 15 serving as locking elements can be constructed as individual structural components. Each lug 15 has at an end thereof a button-like disk 18. In this embodiment, the gap 11 in the base member 9 is not continuous; rather, slot-like passage openings 19 are provided in the base member 9. Also, as shown in FIG. 13, the lugs 15 serving as locking elements have a solid cross section over the entire length Thereof. In that case, slots 20 are provided in the web 3 of the spirit level body 1 near the toothed sides 8 of the recesses 7. This provides the sides 8 of the recesses 7 with a sufficient elastic deformability, so that the lugs 15 which are toothed on both sides can be inserted in the recesses 7. This insertion takes place in the plane of the drawing.

If the elastic deformability of the components to be mated, i.e., recess 7 and lug 15, is provided in the recess 7, as shown in FIG. 11, it is also possible to construct the base member 9 together with the lugs 15 in a single piece. This embodiment in shown in FIGS. 15, 16 and 17. For reasons of ease of manufacture, i.e., to facilitate demolding of the component made as an injection molded article, the lugs 15 are provided with toothings only on the outer sides thereof. The corresponding recess 7 in the web 3 of the spirit level body 1 then also has one toothed side 8. The advantage of the configuration of the embodiment of the FIGS. 15 to 17 is the fact that only a single component must be manufactured and assembled for obtaining the desired closure of the end face of the spirit level body 1, while in the other embodiments it is necessary to manufacture and assemble several components. The components used for producing the closure of the end of the spirit level body are made of suitable plastics materials.

The invention is not limited by the embodiments described above which are presented as examples only but can be modified in various ways within the scope of protection defined by the appended patent claims.

I claim:

1. A spirit level comprising a spirit level body having an axis, two end faces and an I-shaped cross-section with two flanges and a web extending between the two flanges, the spirit level body having a height and a width, at least one spirit level vial being mounted in the web of the spirit level body, an end cap mounted on each end face of the spirit level body, the end cap comprising a rectangular plate-shaped base member having first and second sides, the base member having a height and a width, wherein the height and the width of the base member are essentially equal to the height and width of the spirit level body, two wing lugs being mounted on the first side of the base member, the two wing lugs defining a gap therebetween, the gap extending at least along a portion of the height of the base member, each end face having at least one recess, each recess having at least one toothed side, each recess having a depth in axial direction of the spirit level body, further comprising at least one projecting lug for fastening the base member to the end face of the spirit level body, the projecting lug extending through the gap between the wing lugs and having a contour corresponding to a contour of the at least one recess, the at least one projecting lug being in positively locking engagement with the at least one recess, the at least one projecting lug having an end portion, the end portion of the projecting lug resting against the second side of the base member, each wing lug having a height extending at a right angle from the base member, and wherein the height of the wing lugs is at least as large as the depth of the at least one recess.

2. The spirit level according to claim 1, wherein the at least one projecting lug has a width and the web of the spirit level body has a thickness, and wherein the width of the projecting lug equals the thickness of the web.

3. The spirit level according to claim 1, wherein the end portion of the at least one projecting lug is plate-shaped.

4. The spirit level according to claim 3, wherein the plate-shaped end portion of the lug is rectangular.

5. The spirit level according to claim 4, wherein a rectangular indentation is provided at the second side of the base member, the end portion of the projecting lug having a thickness, the indentation having a depth, the indentation and the base member having a circumferential contour, wherein the circumferential contour and the depth of the rectangular indentation correspond to the circumferential contour and the thickness of the end portion, such that the rectangular plate is received flush in the rectangular indentation.

6. The spirit level according to claim 3, comprising at least two projecting lugs integrally connected to the plate-shaped end portion.

7. The spirit level according to claim 6, wherein the projecting lugs have slots extending in axial direction of the spirit level body.

8. The spirit level according to claim 6, the at least one recess has two sides, and wherein the web of the spirit level body has slots extending parallel to and adjacent at least one of the sides of the at least one recess.

9. The spirit level according to claim 1, wherein the at least one projecting lug is elastically deformable.

10. The spirit level according to claim 1, wherein the at least one recess in the end face of the spirit level body is elastically deformable.

11. The spirit level according to claim 1, wherein the base member defines an opening, the opening and the gap between the wing lugs being in alignment with each other.

* * * * *